United States Patent
Sakai et al.

(10) Patent No.: US 11,639,199 B2
(45) Date of Patent: May 2, 2023

(54) VEHICLE BODY SIDE PART STRUCTURE (71) Applicant: HONDA MOTOR CO., LTD., Tokyo (JP)

(72) Inventors: Hiroyuki Sakai, Wako (JP); Shohei Ohji, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 102 days.

(21) Appl. No.: 17/431,441

(22) PCT Filed: Jan. 29, 2020

(86) PCT No.: PCT/JP2020/003144
§ 371 (c)(1),
(2) Date: Aug. 17, 2021

(87) PCT Pub. No.: WO2020/170739
PCT Pub. Date: Aug. 27, 2020

(65) Prior Publication Data
US 2022/0073145 A1 Mar. 10, 2022

(30) Foreign Application Priority Data
Feb. 20, 2019 (JP) .............................. JP2019-028041

(51) Int. Cl.
B62D 25/08 (2006.01)
B62D 25/06 (2006.01)
B62D 25/04 (2006.01)
B62D 27/02 (2006.01)

(52) U.S. Cl.
CPC ............. *B62D 25/04* (2013.01); *B62D 25/06* (2013.01); *B62D 25/08* (2013.01); *B62D 27/023* (2013.01)

(58) Field of Classification Search
CPC ........ B62D 25/04; B62D 25/06; B62D 25/08; B62D 27/023
USPC .................................. 296/23.01, 3, 4, 29, 30
See application file for complete search history.

(56) References Cited

FOREIGN PATENT DOCUMENTS

| CN | 104602992 | 5/2015 |
|---|---|---|
| DE | 10001989 | 7/2001 |
| JP | 62-173274 | 11/1987 |
| JP | 09-290775 | 11/1997 |
| JP | 2006-298164 | 11/2006 |
| JP | 2006-312358 | 11/2006 |
| JP | 2010-042770 | 2/2010 |
| JP | 2010-179763 | 8/2010 |

(Continued)

OTHER PUBLICATIONS

Chinese Notice of Allowance for Chinese Patent Application No. 202080006999.4 dated Nov. 4, 2022.

(Continued)

*Primary Examiner* — Dennis H Redder
(74) *Attorney, Agent, or Firm* — Amin, Turocy & Watson, LLP (57) ABSTRACT A vehicle body side part structure (10) includes a roof side rail (17) and a quarter pillar (15). The roof side rail extends in a vehicle body forward/rearward direction to form a first hollow structure. In the quarter pillar, a second hollow structure is formed, and an upper end portion is connected so as to cross the roof side rail. In addition, in the quarter pillar, an opening section (71) at which the roof side rail is opened, is closed by a lid part (481) at the upper end portion, in an intersecting part of the roof side rail and the upper end portion of the quarter pillar.

5 Claims, 9 Drawing Sheets

(56) References Cited

FOREIGN PATENT DOCUMENTS

| | | |
|---|---|---|
| JP | 2013-001226 | 1/2013 |
| JP | 2013-112053 | 6/2013 |
| JP | 2015-020609 | 2/2015 |

OTHER PUBLICATIONS

International Search Report and Written Opinion for International Application No. PCT/JP2020/003144 dated Apr. 7, 2020, 10 pages.

VEHICLE BODY SIDE PART STRUCTURE

TECHNICAL FIELD

The present invention relates to a vehicle body side part structure.

Priority is claimed on Japanese Patent Application No. 2019-028041, filed Feb. 20, 2019, the content of which is incorporated herein by reference.

BACKGROUND ART

As a vehicle body side part structure, for example, there is known a configuration in which a side body that constitutes a vehicle body frame surrounding an opening section of a side door is provided, a frame inside a vehicle body and a side outer panel that constitutes a design surface outside the vehicle body are assembled to each other, and an upper end portion of a quarter pillar reinforcement member (or a rear pillar reinforcement, also referred to as a C-pillar reinforcement member) is joined to a roof side rail reinforcement member that constitutes a vehicle body upper part frame of the frame (for example, see Patent Literature 1).

Further, as a configuration for securing strength and rigidity of the vehicle body rear part, it is conceivable to extend the roof side rail reinforcement member until a rearmost pillar (a rear pillar, a D-pillar or a gate pillar).

CITATION LIST

Patent Literature

[Patent Literature 1]
Japanese Unexamined Patent Application, First Publication No. 2006-312358

SUMMARY OF INVENTION

Technical Problem

However, when the upper end portion of the quarter pillar reinforcement member is joined to the roof side rail reinforcement member as in Patent Literature 1, strength and rigidity may be excessively enhanced, productivity may be deteriorated, or the vehicle body weight may be increased. An aspect of the present invention is directed to providing a vehicle body side part structure capable of securing strength and rigidity of a vehicle body without increasing the weight of the vehicle body.

Solution to Problem (1) A vehicle body side part structure according to the present invention includes a roof side rail in which a first hollow structure is formed by a roof inner side rail and a roof side rail outer section of a side outer panel being jointed with each other and extending in a vehicle body forward/rearward direction; and a quarter pillar in which a second hollow structure is formed by a pillar-side extension part, which is continuous with the roof inner side rail, and a quarter pillar outer section of the side outer panel being joined with each other and extending in a vehicle body upward/downward direction, wherein the roof inner side rail has a roof side rail reinforcement member that extends in the vehicle body forward/rearward direction and that forms a closed cross section at inside of the first hollow structure, the quarter pillar has a pillar reinforcement member that forms a closed cross section extending in the vehicle body upward/downward direction at inside of the second hollow structure with the pillar-side extension part, and in an intersecting part of the roof side rail and the quarter pillar, a third hollow structure is formed by closing an opening section, at which the roof side rail is opened, with a lid part at an upper end portion of the pillar reinforcement member.

In the aspect of the above-mentioned (1), the opening section of the roof side rail is closed by the lid part of the upper end portion of the quarter pillar reinforcement member. Accordingly, by only closing the opening section with the upper end portion of the quarter pillar reinforcement member, the first hollow structure of the roof side rail can be made to cross the opening section and to become approximately continuous in the vehicle body forward/rearward direction. In particular, the lid part has a function of a bulkhead that partitions the cross section and twisting or deformation in the cross section of the opening section can be suppressed due to a difference in stress directions of the roof side rail and the quarter pillar.

Accordingly, strength and rigidity of surroundings of the side door, surroundings of the roof, or the vehicle body rear part can be secured by making the first hollow structure of the roof side rail continuous in the vehicle body forward/rearward direction while crossing the opening section, without increasing the weight of the vehicle body because there is no need to extend the upper end portion of the quarter pillar reinforcement member (or the rear pillar reinforcement, also referred to as a C-pillar reinforcement member) until the roof side rail reinforcement member.

Further, the "closing" allows a small gap between the lid part of the upper end portion of the quarter pillar reinforcement member and the side outer panel (the quarter pillar outer section) on an outer side, and may be a size which is large enough to generate a sufficient resistance against the twist of the quarter pillar with respect to the roof side rail. The above mentioned "approximately continuous" also means the same.

(2) In the aspect of the above-mentioned (1), the roof side rail may include the roof inner side rail having a flat plate shape and the roof side rail reinforcement member having a cross-sectional U shape, at front of the opening section in the vehicle body, and the roof side rail may join with an upper end portion of a reinforcement member of a center pillar.

Here, the center pillar (a so-called B-pillar) is provided in front of the quarter pillar in the vehicle body. Here, in the aspect of the above-mentioned (2), the roof inner side rail (the inner surface (the rail inner sidewall)) having a flat plate shape and the roof side rail reinforcement member having a cross-sectional U shape are provided in the front of the opening section formed in the roof side rail in the vehicle body. Accordingly, the upper end portion of the reinforcement member of the center pillar can be joined to the roof side rail reinforcement member.

Accordingly, the upper end portion of the reinforcement member of the center pillar is reinforced by the roof side rail reinforcement member. Accordingly, a load input to the center pillar due to a lateral collision can be transmitted to the roof side rail from the center pillar, and the input load can be supported by the center pillar.

(3) In the aspect of the above-mentioned (1), the roof inner side rail may be formed in substantially an L shape constituted by at least an inner surface and a bottom surface thereof at rear of the opening section, and a surface of the quarter pillar reinforcement member opposite to a door that opens and closes a door opening section may be inclined outward in a vehicle width direction at a rear side of the vehicle body, a substantially triangular closed cross section is formed with the surface of the pillar reinforcement member and the pillar-side extension part constituted by at least an inner surface and a rear surface thereof, and the bottom surface and the rear surface may be continuous with each other.

The pillar-side extension part is also a thick steel plate, has substantially an L shape constituted by at least the inner surface and the rear surface thereof, and the substantially triangular closed cross section is formed with the quarter pillar reinforcement member. In addition, the roof inner side rail is also a thick steel plate continuous with the pillar-side extension part, and formed in substantially an L shape constituted by at least the inner surface and the bottom surface thereof at rear of the opening section. Accordingly, support strength of the roof side rail reinforcement member disposed in front of the opening section is increased. That is, by closing the substantially triangular opening section with the upper end portion of the quarter pillar reinforcement member, the rear end of the roof side rail reinforcement member can be strongly supported. Accordingly, bending stress of the first hollow structure of the roof side rail above the side door can be sufficiently secured.

Further, in the embodiment, the pillar reinforcement member as a stepped shape can secure the sealing surface with the door.

(4) In the aspect of the above-mentioned (3), the quarter pillar reinforcement member may have: the lid part configured to close the opening section; and a flange that extends from the lid part toward the roof inner side rail and that is joined to a circumferential edge of the opening section of the pillar-side extension part.

Accordingly, stress applied to the quarter pillar reinforcement member (i.e., the pillar) can be transmitted to the roof inner side rail.

(5) In the aspect of the above-mentioned (4), the vehicle body side part structure may include a wheel house to which a lower end portion of the pillar reinforcement member is joined; a side sill extending from a front end portion of the wheel house toward a front side of the vehicle body; and a wheel arch reinforcement member provided on the wheel house and extending from a lower end portion of the pillar to the side sill, and the pillar reinforcement member may be connected to a side sill reinforcement member of the side sill via the wheel arch reinforcement member.

Here, the pillar reinforcement member, the wheel arch reinforcement member, and the side sill reinforcement member constitute a part of the frame member of the vehicle body side part structure. Here, in the aspect of the above-mentioned (5), when the pillar reinforcement member is connected to the side sill reinforcement member via the wheel arch reinforcement member, the vehicle body side part structure can be strongly formed.

Advantageous Effects of Invention

According to the aspect of the present invention, the opening section of the roof side rail is blocked by the upper end portion of the quarter pillar reinforcement member. Accordingly, strength and rigidity of the vehicle body side part (the roof side rail) can be secured without increasing the weight of the roof side rail reinforcement member.

DESCRIPTION OF EMBODIMENTS

Hereinafter, an embodiment of the present invention will be described with reference to the accompanying drawings. In the drawings, an arrow FR indicates a forward direction of a vehicle, an arrow UP indicates an upward direction of the vehicle, and an arrow LH indicates a leftward direction of the vehicle. A vehicle body side part structure has a substantially laterally symmetrical configuration, and hereinafter, a left configuration will be described and description of a right configuration will be omitted.

Figure 1:
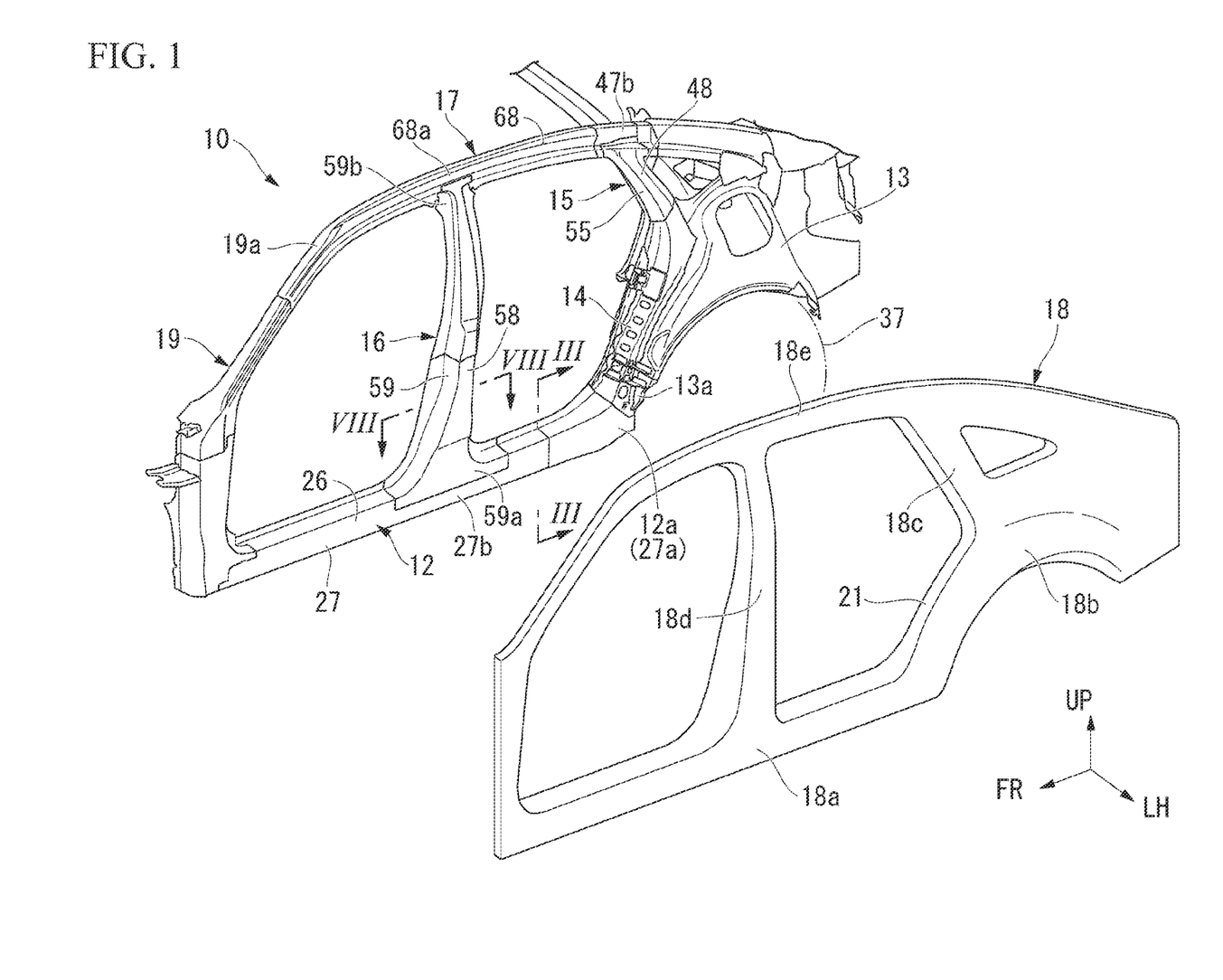
FIG. 1 is an exploded perspective view showing a vehicle body side part structure of an embodiment according to the present invention.
Figure 2:
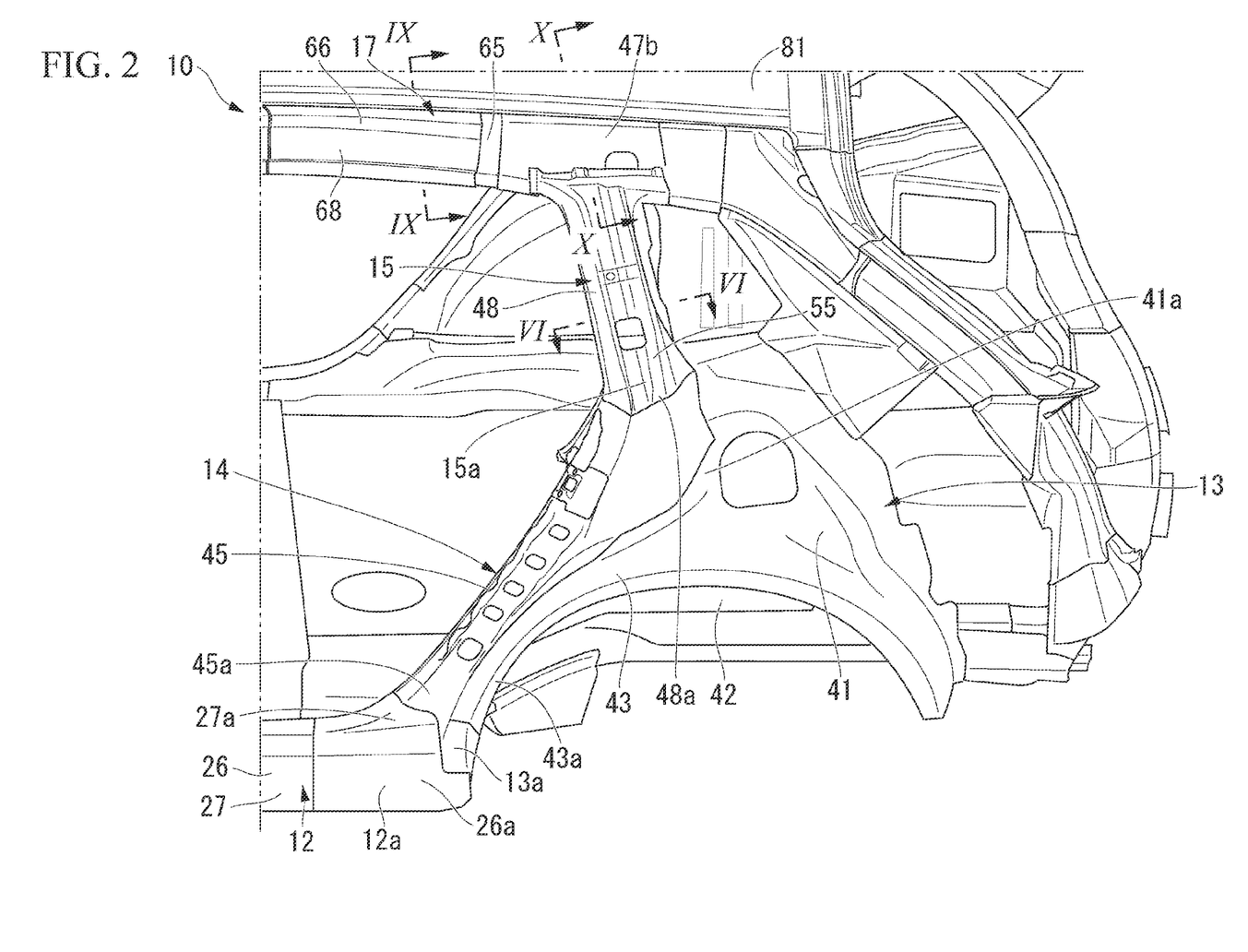
FIG. 2 is a perspective view of the vehicle body side part structure of the embodiment, from which a side outer panel is removed.

As shown in FIGS. 1 and 2, a vehicle body side part structure 10 includes a side sill 12, a rear wheel house (a wheel house) 13, a wheel arch reinforcement member 14, a quarter pillar 15, a center pillar 16, a roof side rail 17, and a side outer panel 18. The quarter pillar 15 is a so-called C-pillar. The center pillar 16 is a so-called B-pillar.

The side outer panel 18 is a thin plate panel having press ductility that forms a design surface on an outer side in a vehicle width direction. The side outer panel 18 has a side sill outer panel part 18a, a rear wheel outer section 18b, a quarter pillar outer section 18c, a center pillar outer section 18d, and a roof side rail outer section 18e.

In the vehicle body side part structure 10, a door opening section 21 of a side door of the vehicle body is formed by the side sill outer panel part 18a, the rear wheel outer section 18b, the quarter pillar outer section 18c, the center pillar outer section 18d and the roof side rail outer section 18e. The door opening section 21 is opened and closed by a door (not shown).

Figure 3:
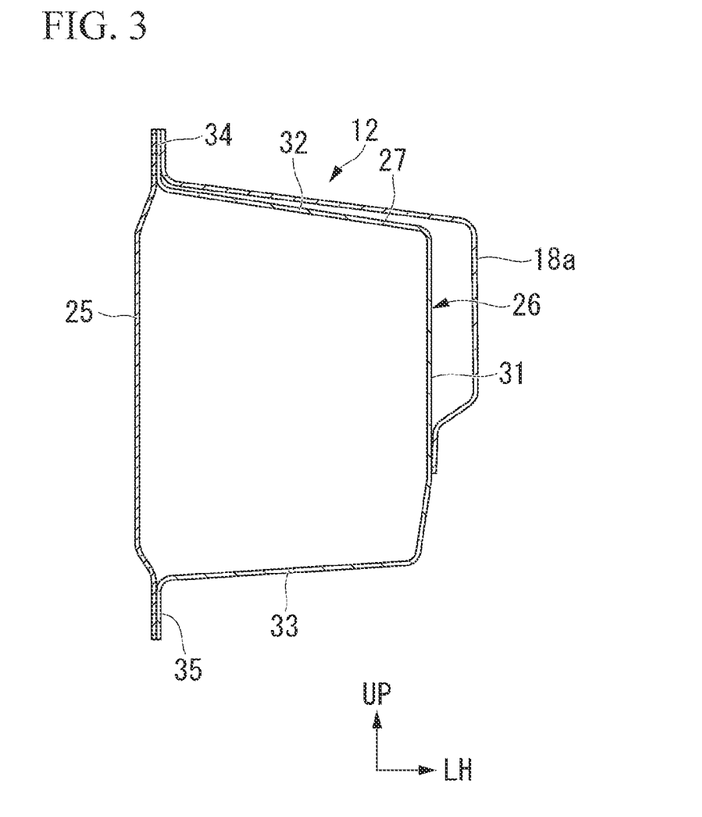
FIG. 3 is a cross-sectional view showing a side sill outer panel part that is joined to a side sill, broken along line in FIG. 1.

As shown in FIGS. 2 and 3, for example, the side sill 12 is disposed on a left outer side of the vehicle body in the vehicle width direction, and extends in a vehicle body forward/rearward direction. The side sill 12 includes a side sill inner 25, a side sill reinforcement member 26, and the side sill outer panel part 18a.

The side sill 12 is formed in a closed cross section with a rectangular frame shape by the side sill inner 25 and the side sill reinforcement member 26, and the side sill reinforcement member 26 is covered with the side sill outer panel part 18a from an outer side of the vehicle. Hereinafter, the closed cross section with a rectangular frame shape is referred to as "a side sill closed cross-sectional part 27."

The side sill reinforcement member 26 has a side sill reinforcement outer wall 31, a side sill reinforcement upper wall 32, a side sill reinforcement lower wall 33, a side sill reinforcement upper flange 34, and a side sill reinforcement lower flange 35.

The side sill reinforcement upper wall 32 extends from an upper side of the side sill reinforcement outer wall 31 toward an inner side in the vehicle width direction (i.e., the side of the side sill inner 25). The side sill reinforcement lower wall 33 extends from a lower side of the side sill reinforcement outer wall 31 toward an inner side in the vehicle width direction (i.e., the side of the side sill inner 25). The side sill reinforcement upper flange 34 extends upward from an inner side of the side sill reinforcement upper wall 32. The side sill reinforcement lower flange 35 extends downward from an inner side of the side sill reinforcement lower wall 33.

The side sill reinforcement member 26 is formed in a cross-sectional hat shape by the side sill reinforcement outer wall 31, the side sill reinforcement upper wall 32, the side sill reinforcement lower wall 33, the side sill reinforcement upper flange 34, and the side sill reinforcement lower flange 35. The side sill reinforcement upper flange 34 and the side sill reinforcement lower flange 35 are joined to each other while overlapping the side sill inner 25 from an outer side in the vehicle width direction. Accordingly, in the side sill 12, the side sill closed cross-sectional part 27 is formed in a rectangular frame shape by the side sill reinforcement member 26 and the side sill inner 25.

A front end portion 13a of the rear wheel house 13 is connected to a rear end portion 27a of the side sill closed cross-sectional part 27. In other words, the side sill 12 extends from the front end portion 13a of the rear wheel house 13 toward the front of the vehicle body.

The rear wheel house 13 is formed to cover a rear tire 37 from above. The rear wheel house 13 includes a rear wheel house outer 41 and a rear wheel house inner 42 (see also FIG. 6). The rear wheel house outer 41 has a wheel arch 43 configured to cover the rear tire 37 from above and outside. A front part 43a of the wheel arch 43 is joined to the rear end portion 27a of the side sill closed cross-sectional part 27.

The wheel arch 43 extends such that the front part 43a is inclined toward a rear upper side of the vehicle body from the rear end portion 27a of the side sill closed cross-sectional part 27 to a front upper part 41a of the rear wheel house outer 41.

Hereinafter, the front part 43a of the wheel arch 43 is referred to as "the wheel arch front part 43a."

The wheel arch reinforcement member 14 overlaps the wheel arch front part 43a in front of the vehicle body and from diagonally above. The wheel arch reinforcement member 14 extends from a lower end portion 48a of a reinforcement member (a quarter pillar reinforcement member) 48 of the quarter pillar 15 to a rear end portion 26a of the reinforcement member (i.e., the side sill reinforcement member) 26 of the side sill 12.

Accordingly, a closed cross section is formed from the side sill closed cross-sectional part 27 to a quarter pillar closed cross-sectional part 55 by the wheel arch front part 43a and the wheel arch reinforcement member 14.

Hereinafter, a closed cross section of the wheel arch front part 43a and the wheel arch reinforcement member 14 is referred to as "a wheel arch closed cross-sectional part 45."

The rear end portion 27a of the side sill closed cross-sectional part 27 is joined to a front end portion 45a of the wheel arch closed cross-sectional part 45.

The quarter pillar 15 stands up from a front upper part of the rear wheel house 13.

Figure 4:
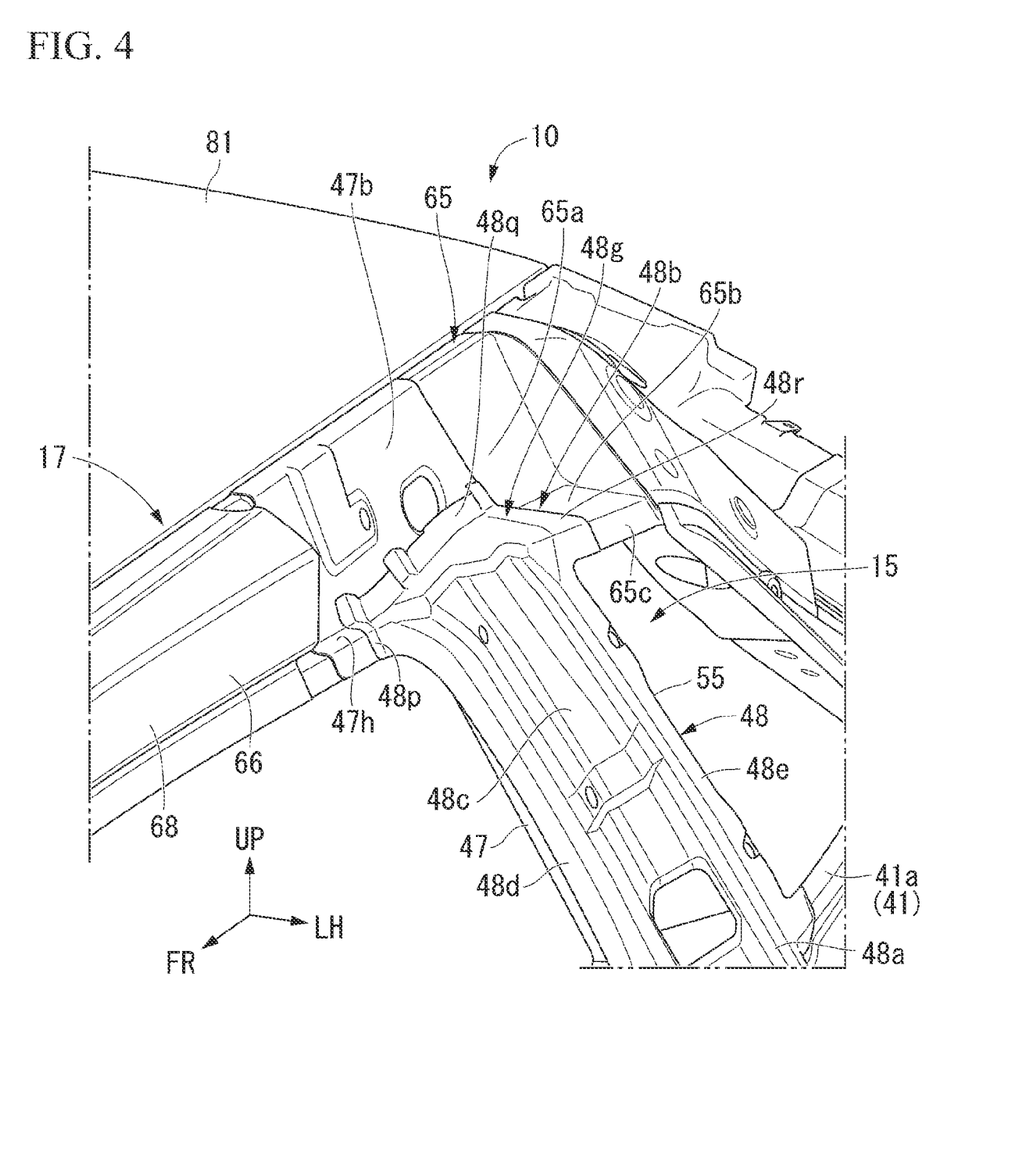
FIG. 4 is a perspective view of a portion in which an upper end portion of a pillar reinforcement member and a roof inner side rail in FIG. 2 are joined to each other.
Figure 5:
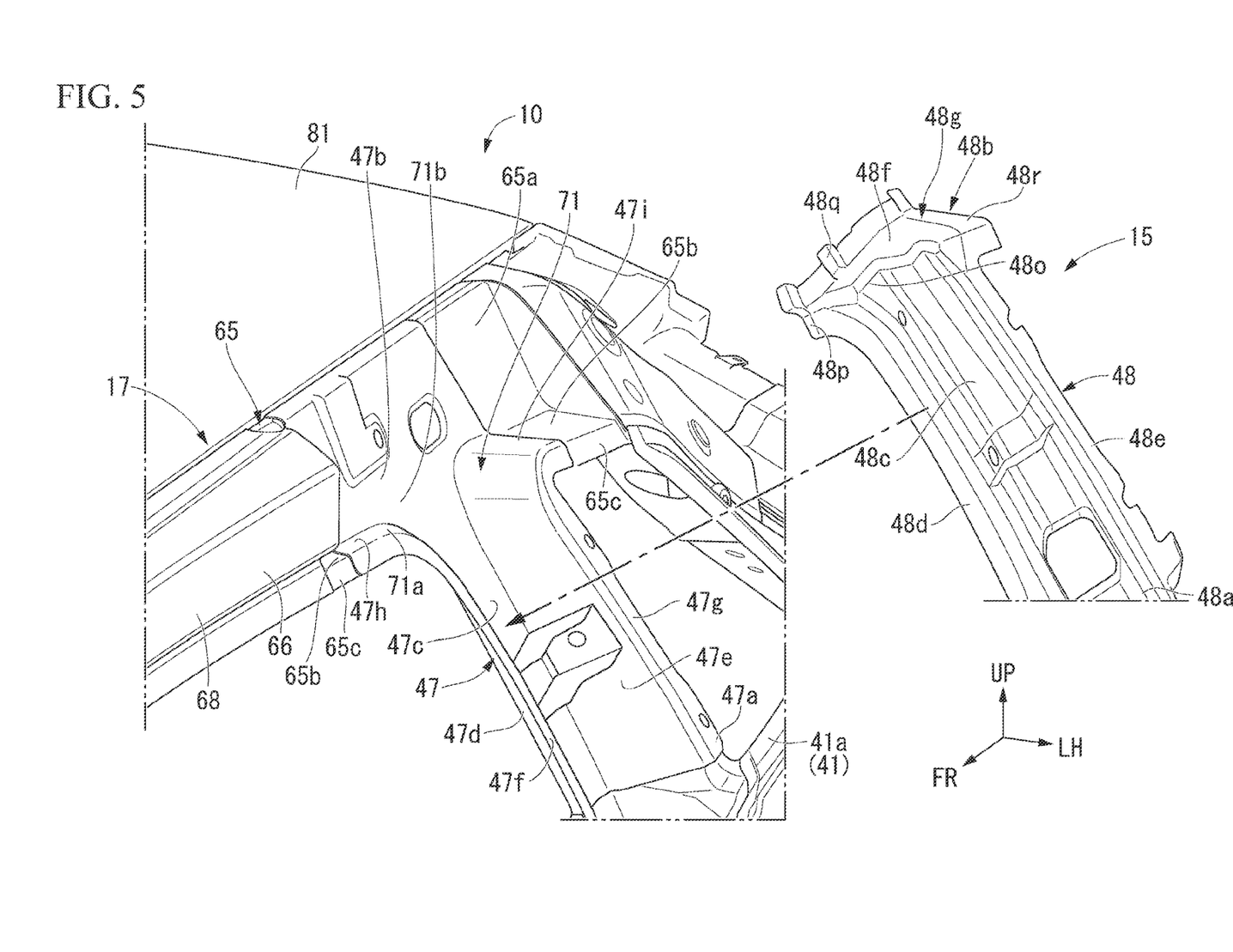
FIG. 5 is an exploded perspective view showing a pillar-side extension part of the roof inner side rail and the pillar reinforcement member in FIG. 4.

As shown in FIGS. 4 and 5, the quarter pillar 15 crosses the roof side rail 17. The quarter pillar 15 includes the pillar-side extension part 47 continuous with a roof inner side rail 65, which will be described below, the quarter pillar reinforcement member (the pillar reinforcement member) 48, and the quarter pillar outer section 18c (see FIG. 1).

The pillar-side extension part 47 configures an inner pillar of the quarter pillar 15, i.e., an inner quarter pillar. The pillar-side extension part 47 has a lower end portion 47a joined to the front upper part 41a of the rear wheel house outer 41. The pillar-side extension part 47 extends diagonally upward in front of the vehicle body from the front upper part 41a of the rear wheel house outer 41 toward the roof side rail 17. The pillar-side extension part 47 has an upper end portion 47b continuous with the roof inner side rail 65 (to be described below) of the roof side rail 17.

Specifically, the upper end portion 47b of the pillar-side extension part 47 is continuous with the roof inner side rail 65 (a rail inner sidewall (an inner surface) 65a) having a substantially flat plate shape in front of the vehicle body. Further, the upper end portion 47b of the pillar-side extension part 47 is continuous with the roof inner side rail 65 (the rail inner sidewall (the inner surface) 65a and a rail inner bottom section (a bottom surface) 65b (see FIGS. 5 and 9)) with substantially an L shape on the rear side of the vehicle body. Further, here, "continuous" includes a case in which they are formed integrally or in which they are joined after being formed individually.

Figure 6:
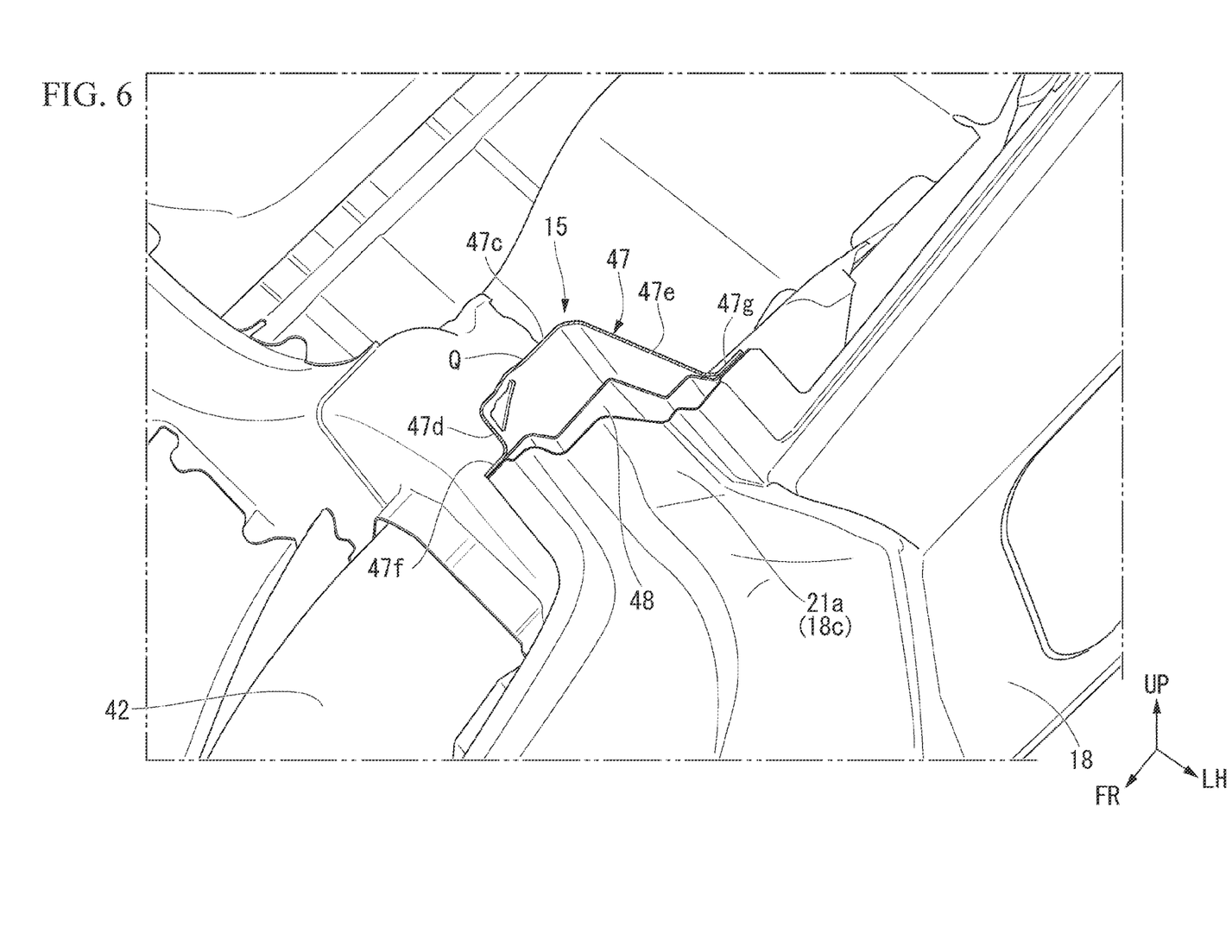
FIG. 6 is a perspective view showing the side outer panel joined to a pillar (a quarter pillar) in a state in which the pillar is broken, along line VI-VI in FIG. 2.

As shown in FIGS. 5 and 6, the pillar-side extension part 47 has a pillar inner bottom section (an inner surface) 47c, a pillar inner front leg section 47d, a pillar inner rear leg section (a rear surface) 47e, a pillar inner front flange 47f, and a pillar inner rear flange 47g.

The pillar inner bottom section 47c is disposed in the vehicle body forward/rearward direction and continuous with the rail inner sidewall 65a. The pillar inner front leg section 47d is connected to a front side of the pillar inner bottom section 47c. The pillar inner front leg section 47d extends outward from the front side of the pillar inner bottom section 47c in the vehicle width direction by a front leg length dimension W1 (see FIG. 7). The pillar inner front leg section 47d has an upper end portion 47h continuous along the rail inner bottom section 65b and the rail inner flange 65c of the roof inner side rail 65 toward the front of the vehicle body from above (they may be joined integrally or individually from above).

In addition, the pillar inner rear leg section 47e is connected to a rear side of the pillar inner bottom section 47c.

The pillar inner rear leg section 47e extends outward from the rear side of the pillar inner bottom section 47c in the vehicle width direction by a rear leg length dimension W2 (see FIG. 7), and is disposed on the rear side of the pillar inner front leg section 47d in the vehicle body. The pillar inner rear leg section 47e has the rear leg length dimension W2 that is larger than the front leg length dimension W1 of the pillar inner front leg section 47d by an extent of a thickness of the door. The pillar inner rear leg section (the rear surface) 47e has an upper end portion 47i that is continuous along the rail inner bottom section 65b and the rail inner flange 65c of the roof inner side rail 65 toward the rear side of the vehicle body (may be joined integrally or individually from above).

Further, the pillar inner front flange 47f extends from an outer side of the pillar inner front leg section 47d toward the front of the vehicle body. In addition, the pillar inner rear flange 47g extends from an outer side of the pillar inner rear leg section 47e toward the rear side of the vehicle body.

The pillar-side extension part 47 is formed in an open cross section that is an outward opening of a heteromorphic cross-sectional hat by the pillar inner bottom section 47c, the pillar inner front leg section 47d, the pillar inner rear leg section 47e, the pillar inner front flange 47f, and the pillar inner rear flange 47g. Accordingly, a second hollow structure Q of the quarter pillar 15 is in communication with a first hollow structure P (see FIG. 9) of the roof side rail 17 via an opening section 71. In other words, a part of the opening section 71 is formed by the pillar inner bottom section 47c of the quarter pillar 15 and the pillar-side extension part 47.

The opening section 71 will be described below in detail.

Figure 7:
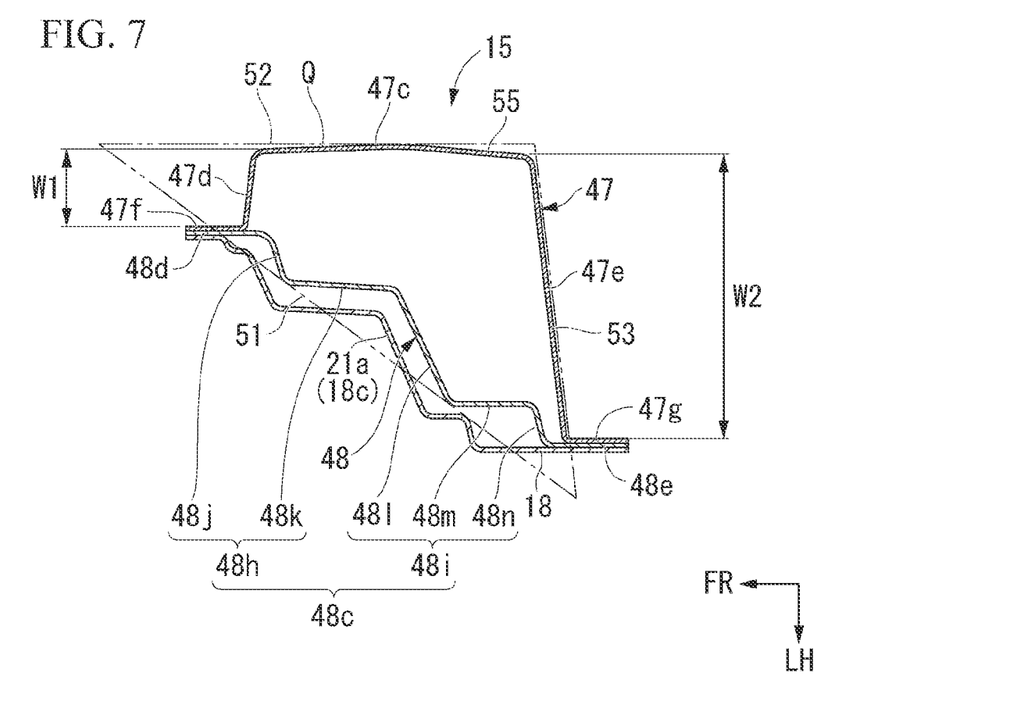
FIG. 7 is a cross-sectional view showing the pillar (the quarter pillar) of FIG. 6.

As shown in FIGS. 6 and 7, the quarter pillar reinforcement member 48 overlaps the pillar-side extension part 47 from an outer side in the vehicle width direction, and is joined to the pillar inner front flange 47f and the pillar inner rear flange 47g. Accordingly, the pillar-side extension part 47 and the quarter pillar reinforcement member 48 form a closed cross section that extends in the vehicle body upward/downward direction. Accordingly, the quarter pillar 15 is reinforced by the quarter pillar reinforcement member 48. The quarter pillar reinforcement member 48 is formed in the second hollow structure Q.

The quarter pillar reinforcement member 48 has the lower end portion 48a joined to the front upper part 41a (see FIG. 4) of the rear wheel house outer 41. In addition, the quarter pillar reinforcement member 48 is joined such that an upper end portion 48b crosses the roof side rail 17.

Specifically, the quarter pillar reinforcement member 48 has a pillar reinforcement step section 48c, a pillar reinforcement front flange 48d, a pillar reinforcement rear flange 48e, a lid part 48f, and a lid part flange (a flange) 48g. The lid part 48f and the lid part flange 48g form the upper end portion 48b of the quarter pillar reinforcement member 48.

The pillar reinforcement front flange 48d is joined to the pillar inner front flange 47f from an outer side in the vehicle width direction. The pillar reinforcement rear flange 48e is joined to the pillar inner rear flange 47g from an outer side in the vehicle width direction.

The pillar reinforcement step section 48c is provided between the pillar reinforcement front flange 48d and the pillar reinforcement rear flange 48e and is disposed near an inner side of an opening surface 21a of the door opening section 21. Since the opening surface 21a is formed in a stepped shape to form a door sill surface, the pillar reinforcement step section 48c also has a first step section 48h and a second step section 48i. The first step section 48h has a first reinforcement leg section 48j and a first reinforcement step section 48k.

The first reinforcement leg section 48j extends outward from the rear side of the pillar reinforcement front flange 48d in the vehicle width direction. The first reinforcement step section 48k extends from the outer side of the first reinforcement leg section 48j toward the rear of the vehicle body. The first step section 48h is formed in an L-shaped cross section by the first reinforcement leg section 48j and the first reinforcement step section 48k. The second step section 48i is formed on the rear side of the first reinforcement step section 48k.

The second step section 48i has a second reinforcement leg section 48l, a second reinforcement step section 48m, and a third reinforcement leg section 48n. The second reinforcement leg section 48l extends outward from the rear side of the first reinforcement step section 48k in the vehicle width direction. The second reinforcement step section 48m extends from the outer side of the second reinforcement leg section 48l toward the rear of the vehicle body. The third reinforcement leg section 48n extends outward from the rear side of the second reinforcement step section 48m in the vehicle width direction to the pillar reinforcement rear flange 48e. The second step section 48i is formed in an L-shaped cross section by the second reinforcement leg section 48l and the second reinforcement step section 48m.

The pillar reinforcement step section 48c is inclined along a first virtual line 51 in a stepped shape from the pillar reinforcement front flange 48d to the pillar reinforcement rear flange 48e in the rear of the vehicle body and outward in the vehicle width direction. In this way, strength and rigidity of the pillar reinforcement step section 48c (i.e., the quarter pillar reinforcement member 48) can be secured by inclining the pillar reinforcement step section 48c in a stepped shape. Further, the pillar reinforcement step section 48c secures a small gap between the pillar reinforcement step section 48c and the side outer panel 18.

Here, the pillar reinforcement front flange 48d is joined to the pillar inner front flange 47f and the pillar reinforcement rear flange 48e is joined to the pillar inner rear flange 47g. Accordingly, a closed cross section extending in the vehicle body upward/downward direction is formed by the pillar-side extension part 47 and the quarter pillar reinforcement member 48. Hereinafter, the closed cross section is referred to as the quarter pillar closed cross-sectional part 55.

In addition, the pillar-side extension part 47 is formed such that the rear leg length dimension W2 of the pillar inner rear leg section 47e is greater than the front leg length dimension W1 of the pillar inner front leg section 47d by an extent of the thickness of the door. Further, the quarter pillar reinforcement member 48 has the pillar reinforcement step section 48c that is inclined in a stepped shape along the first virtual line 51.

Accordingly, the quarter pillar closed cross-sectional part 55 has a cross-sectional shape that is a substantially triangular shape following the first virtual line 51, a second virtual line 52 and a third virtual line 53. The second virtual line 52 is a line along the pillar inner bottom section 47c. The third virtual line 53 is a line along the pillar inner rear leg section 47e.

The lid part 48f and the lid part flange 48g of the quarter pillar reinforcement member 48 will be described below in detail.

The quarter pillar outer section 18c is a member that constitutes a part of the side outer panel 18 (see also FIG. 1) and is joined to the pillar reinforcement front flange 48d and the pillar reinforcement rear flange 48e from an outer side in the vehicle width direction. In this state, the quarter pillar outer section 18c is disposed along the pillar reinforcement step section 48c on an outer side in the vehicle width direction. The quarter pillar outer section 18c is inclined along the pillar reinforcement step section 48c from the pillar reinforcement front flange 48d to the pillar reinforcement rear flange 48e in the rear of the vehicle body and outward in the vehicle width direction. The quarter pillar outer section 18c forms the opening surface 21a of the door opening section 21 (see FIG. 1). The door opening section 21 is opened and closed by the door (not shown). That is, the pillar reinforcement step section 48c forms a sealing surface opposite to the door that opens and closes the door opening section 21.

Figure 8:
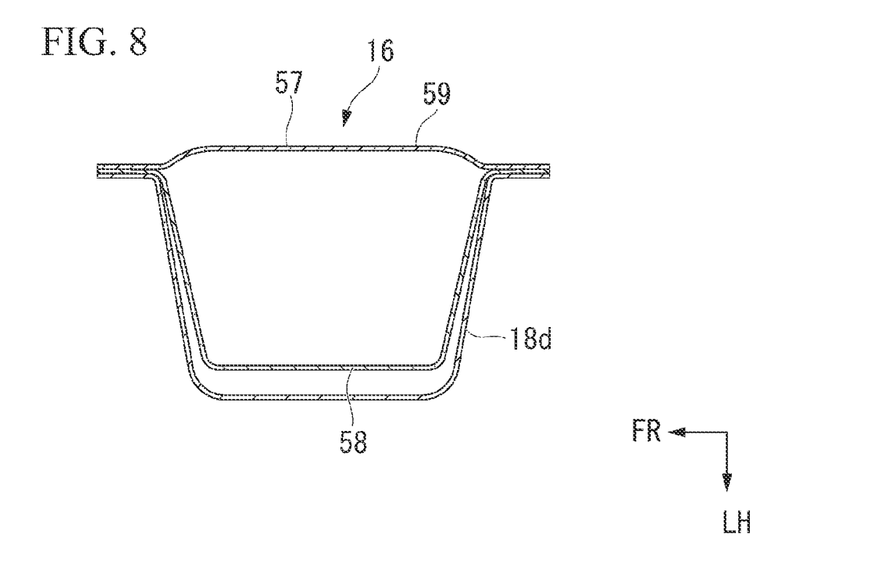
FIG. 8 is a cross-sectional view showing a center pillar outer section of the side outer panel joined to a center pillar in a state in which the center pillar is broken, along line VIII-VIII in FIG. 1.

As shown in FIGS. 1 and 8, the center pillar 16 is provided in front of the quarter pillar 15 with an interval in the vehicle body. The center pillar 16 stands up from a center 12b of the side sill 12 in the vehicle body forward/rearward direction. The center pillar 16 includes a center pillar inner 57, a center pillar reinforcement member 58, and the center pillar outer section 18d. A closed cross section is formed between the center pillar inner 57 and the center pillar reinforcement member 58. Hereinafter, the closed cross section is referred to as a center pillar closed cross-sectional part 59.

The center pillar closed cross-sectional part 59 has a lower end portion 59a that is joined to the side sill closed cross-sectional part 27 so as to cross the side sill closed cross-sectional part 27 at a center 27b of the side sill closed cross-sectional part 27 in the vehicle body forward/rearward direction. In addition, the center pillar closed cross-sectional part 59 has an upper end portion 59b that is joined to the roof side rail closed cross-sectional part 68 so as to cross the roof side rail closed cross-sectional part 68 from an outer side at a center 68a of a roof side rail closed cross-sectional part 68 (to be described below) of the roof side rail 17 in the vehicle body forward/rearward direction. The center pillar outer section 18d is joined to the center pillar reinforcement member 58 of the center pillar closed cross-sectional part 59 from an outer side in the vehicle width direction.

Here, the quarter pillar reinforcement member 48 is connected to the side sill reinforcement member 26 via the wheel arch reinforcement member 14. That is, the quarter pillar closed cross-sectional part 55 is continuous with the side sill closed cross-sectional part 27 via the wheel arch reinforcement member 14. In addition, the side sill closed cross-sectional part 27 is connected to the center pillar reinforcement member 58 (i.e., the center pillar closed cross-sectional part 59).

The quarter pillar closed cross-sectional part 55, the wheel arch reinforcement member 14, the side sill closed cross-sectional part 27, and the center pillar closed cross-sectional part 59 constitute a part of a frame member of the vehicle body side part structure 10.

Accordingly, the vehicle body side part structure 10 can be strongly formed by connecting the quarter pillar closed cross-sectional part 55 to the side sill closed cross-sectional part 27 via the wheel arch reinforcement member 14 and connecting the side sill closed cross-sectional part 27 to the center pillar closed cross-sectional part 59.

The roof side rail 17 is connected to an upper end portion of the center pillar 16 and an upper end portion 15b (see FIG. 9) of the quarter pillar 15 and extends in the vehicle body forward/rearward direction. The roof side rail 17 extends from a rear upper end portion 19a of a front pillar 19 to a rear part of the vehicle body toward the rear of the vehicle body via the upper end portion of the center pillar 16 and the upper end portion 15b of the quarter pillar 15.

Figure 9:
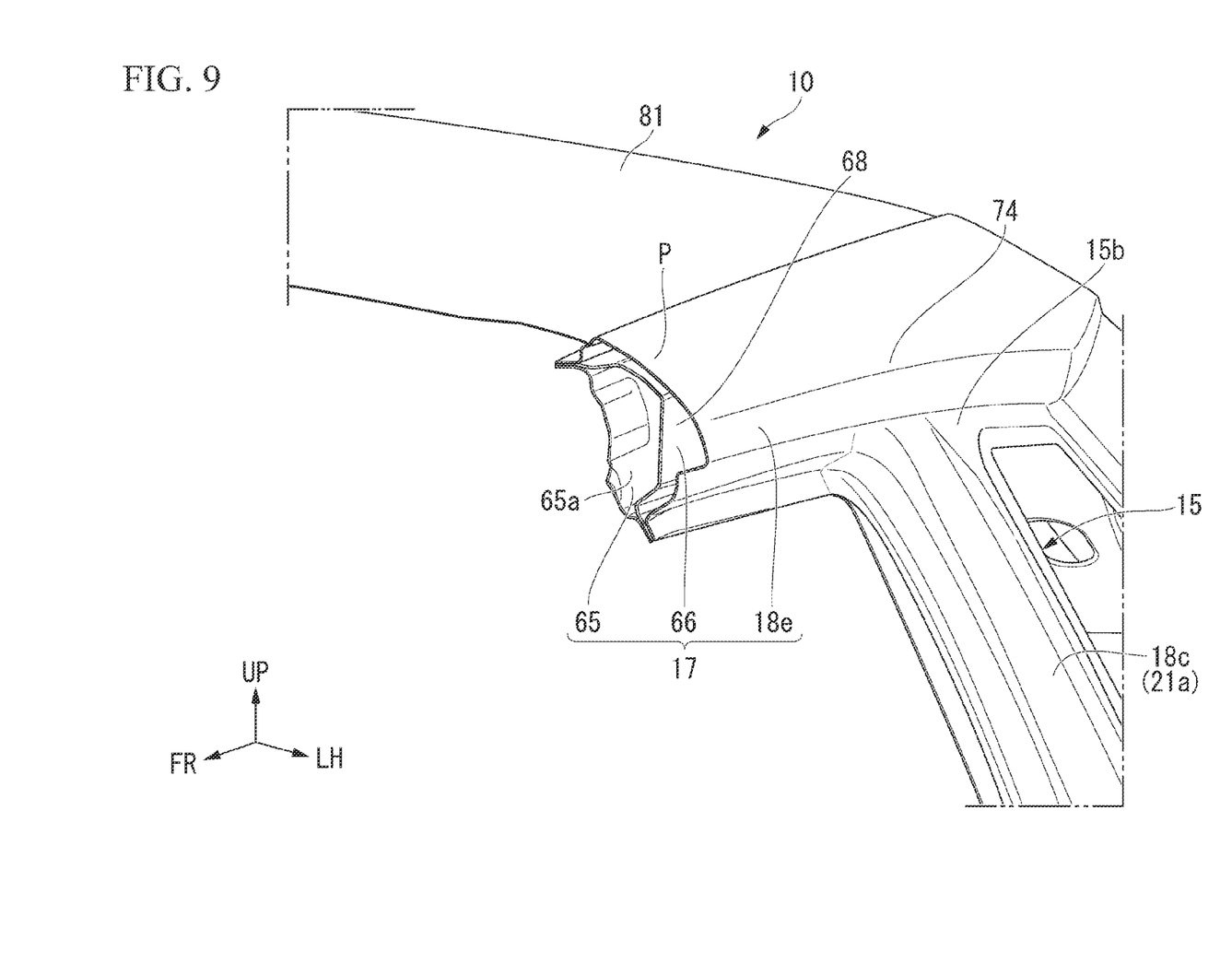
FIG. 9 is a perspective view showing the side outer panel joined to the roof side rail in a state in which the roof side rail is broken, along line IX-IX in FIG. 2.

As shown in FIGS. 5 and 9, the roof side rail 17 includes the roof inner side rail (the roof side inner panel) 65, a roof side rail reinforcement member 66, and the roof side rail outer section 18e at front of the opening section 71. The first hollow structure P extending in the vehicle body forward/rearward direction is formed in front of and behind the opening section 71 by the roof inner side rail 65 and the roof side rail outer section 18e. In the first hollow structure P in front of the opening section 71 in the vehicle body, the roof side rail closed cross-sectional part 68 is formed by the roof inner side rail 65 and the roof side rail reinforcement member 66 as the closed cross section that forms the vehicle body frame of the upper part extending in the vehicle body forward/rearward direction.

Here, the roof inner side rail 65 is constituted by at least the rail inner sidewall (the inner surface) 65a having a substantially flat plate shape in front of the opening section 71 in the vehicle body. In addition, the roof inner side rail 65, which is substantially an L shape, is constituted by at least the rail inner sidewall (the inner surface) 65a and the rail inner bottom section (the bottom surface) 65b at rear side of the opening section 71 in the vehicle body.

The roof side rail reinforcement member 66 extends from the front side in the vehicle body to the upper end portion 47b of the pillar-side extension part 47 so that a rear end portion 66a is disposed near the front side of the upper end portion 47b in the vehicle body.

Here, the second hollow structure Q (see FIG. 6) of the quarter pillar 15 is in communication with the first hollow structure P via the opening section 71. Further, the opening section 71 is greatly expanded from the inside to the outside by an extent of the thickness of the door to correspond to the pillar-side extension part 47 in the rear side of the vehicle body.

The opening section 71 is in communication with the second hollow structure Q (see FIG. 7) of the quarter pillar. Here, the second hollow structure Q of the quarter pillar is formed to have a substantially triangular cross section (see FIGS. 6 and 7). Accordingly, the opening section 71 is formed in a substantially triangular shape. That is, the opening section 71 is open in a substantially triangular shape to correspond to the rail inner bottom section (the bottom surface) 65b of the roof inner side rail 65 at an intersecting part 74 of the roof side rail 17 and the upper end portion 15b of the quarter pillar 15. The roof side rail reinforcement member 66 is provided in front of the opening section 71 in the vehicle body.

Next, the lid part 48f and the lid part flange 48g of the quarter pillar reinforcement member 48 will be described with reference to FIGS. 4, 5 and 10.

Figure 10:
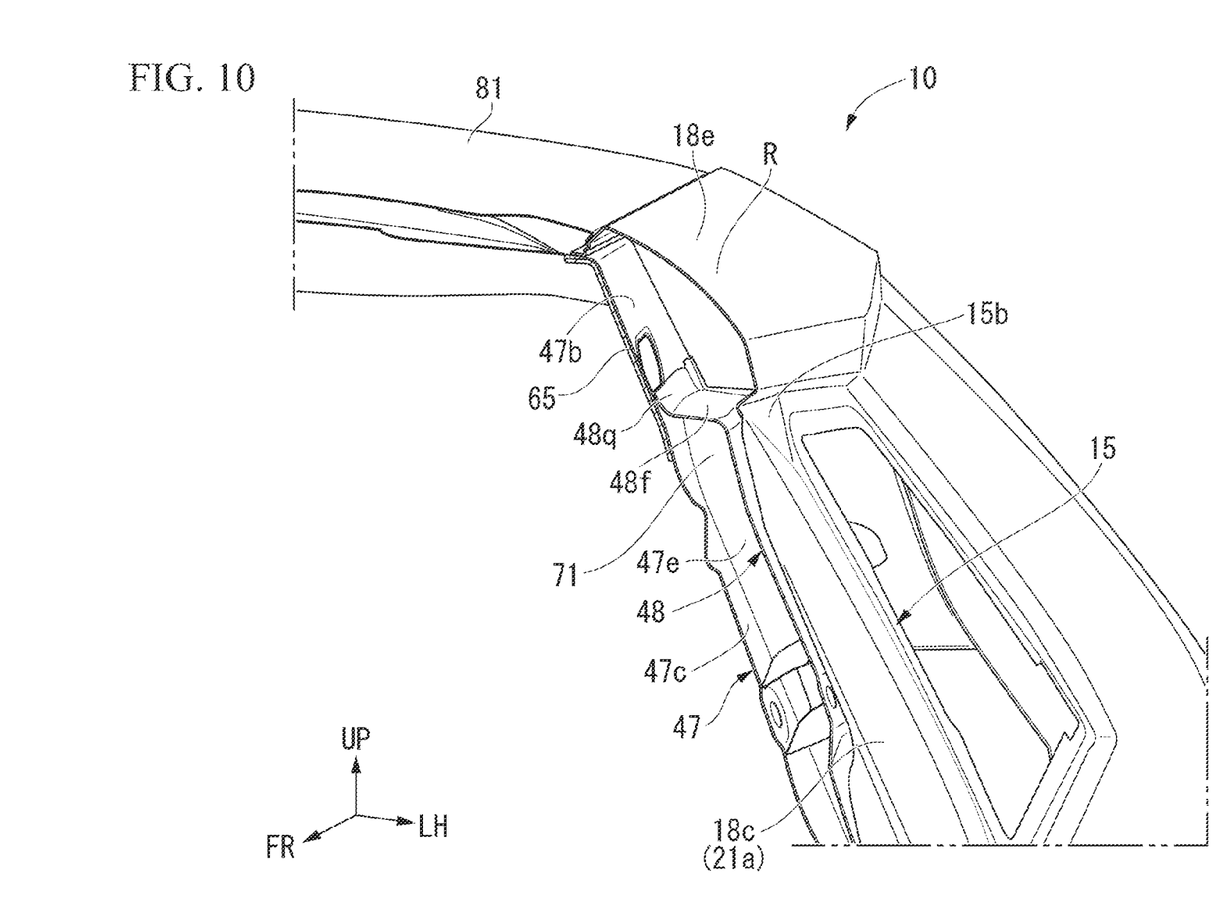
FIG. 10 is a perspective view showing the side outer panel joined to the roof side rail in a state in which the roof side rail is broken, along line X-X in FIG. 2.

As shown in FIGS. 4, 5 and 10, the quarter pillar reinforcement member 48 has the lid part 48f and the lid part flange 48g at the upper end portion 48b. The upper end portion 48b of the quarter pillar reinforcement member 48 is folded inward from a downward neighboring side 48o of the upper end portion 48b along a bottom section of the roof side rail 17 (i.e., the rail inner bottom section 65b of the roof inner side rail 65) in the vehicle width direction. Accordingly, the lid part 48f is disposed above the opening section 71.

The lid part 48f is formed in a substantially triangular shape according to an outer shape of the opening section 71 (see also FIG. 7) and disposed above the opening section 71. The lid part flange 48g is formed along a lid circumferential edge of the lid part 48f. The lid part flange 48g has a first flange 48p, a second flange 48q and a third flange 48r.

The first flange 48p is formed on a front circumferential edge of the lid part 48f. The first flange 48p is joined to the rail inner bottom section 65b and the rail inner flange 65c of the roof inner side rail 65 via the upper end portion 47h of the pillar inner front leg section 47d. Accordingly, the first flange 48p is joined to a front circumferential edge 71a of the opening section 71.

The second flange 48q is folded while standing up from an inner circumferential edge of the lid part 48f along the upper end portion 47b of the pillar-side extension part 47. The second flange 48q is joined to the rail inner sidewall 65a of the roof inner side rail 65 via the upper end portion 47b of the pillar-side extension part 47. Accordingly, the second flange 48q is joined to an inner circumferential edge 71b of the opening section 71.

The third flange 48r is formed on a rear circumferential edge of the lid part 48f. The third flange 48r is joined to the rail inner bottom section 65b and the rail inner flange 65c of the roof inner side rail 65 via the upper end portion 47i of the pillar inner rear leg section 47e. The third flange 48r is joined to a rear circumferential edge 71c of the opening section 71.

In this case, the first flange 48p is joined to the front circumferential edge 71a of the opening section 71 and the second flange 48q is joined to the inner circumferential edge 71b of the opening section 71. In addition, the third flange 48r is joined to the rear circumferential edge 71c of the opening section 71. Accordingly, the lid part flange 48g is joined to the circumferential edges (i.e., the front circumferential edge 71a, the inner circumferential edge 71b, and the rear circumferential edge 71c) of the opening section 71. Accordingly, the opening section 71 is covered with the upper end portion 48b (specifically, the lid part 48f) of the quarter pillar reinforcement member 48 from above and blocked (closed) by the lid part 48f. Strictly, while a small gap is provided between the side outer panel 18 and the lid part 48f, however the small gap is a level that does not create problems. Accordingly, "closed" allows the small gap.

In addition, the opening section 71 is closed by the upper end portion 48b (i.e., the lid part 48f) of the quarter pillar reinforcement member 48 and the lid part flange 48g is joined to a circumferential edge of the opening section 71. Accordingly, the upper end portion 48b of the quarter pillar reinforcement member 48 is strongly jointed to the roof side rail 17.

Further, only the opening section 71 is closed by the upper end portion 48b (the lid part 48f) of the quarter pillar reinforcement member 48. Accordingly, it is possible to form the intersecting part 74 (see FIG. 9) in a third hollow structure R that is continuous with the first hollow structure P (see FIG. 9) formed by the roof inner side rail 65 and the roof side rail outer section 18e.

Accordingly, there is no need to extend an upper end portion of the quarter pillar reinforcement member 48 (or a rear pillar reinforcement, also referred to as a C-pillar reinforcement member) until the roof side rail reinforcement member 66. Accordingly, it is possible to secure strength and rigidity of surroundings of the side door, surroundings of the roof, or rear parts of the vehicle body by making the first hollow structure P of the roof side rail 17 continuous in the vehicle body forward/rearward direction while crossing the opening section 71, without increasing the weight of the vehicle body.

Here, as a comparative example, for example, it is also conceivable that the roof side rail reinforcement member 66 is extended to the rear of the opening section 71 in the vehicle body, and the opening section 71 is closed by forming a closed cross section with the roof side rail reinforcement member 66 and the roof inner side rail 65.

Incidentally, for example, the roof side rail reinforcement member 66 is formed by a U-shaped thick steel plate with a relatively large cross-sectional shape. For this reason, it is conceivable that the weight of the roof side rail (the vehicle body) 17 is increased when the opening section 71 of the roof side rail 17 is closed by extending the roof side rail reinforcement member 66 to the rear of the opening section 71 in the vehicle body.

On the other hand, the vehicle body side part structure 10 of the embodiment is configured to close only the opening section 71 using the upper end portion 48b (i.e., the lid part 48f having a relatively small shape) of the quarter pillar reinforcement member 48. Accordingly, it is possible to secure strength and rigidity of the roof side rail 17 by making the first hollow structure P of the roof side rail 17 continuous in the vehicle body forward/rearward direction without increasing the weight of the vehicle body. Accordingly, it is possible to secure strength and rigidity around a roof 81.

In particular, the lid part 48f has a function of a bulkhead that partitions the cross section (the opening section 71 or the second hollow structure Q), and can suppress twisting or deformation in cross section of the opening section 71 due to a difference in a stress direction applied to the roof side rail 17 and the quarter pillar 15.

In addition, the roof inner side rail 65 is formed in substantially an L shape constituted by at least the rail inner sidewall (the inner surface) 65a and the rail inner bottom section (the bottom surface) 65b at rearward side of the opening section 71 in the vehicle body. In addition, the pillar-side extension part 47 also has the pillar inner bottom section (the inner surface) 47c and the pillar inner rear leg section (the rear surface) 47e that are continuous with each other. A surface of the quarter pillar reinforcement member 48 opposite to the door that opens and closes the door opening section 21 is inclined outward in the vehicle width direction at the rear side of the vehicle body, and substantially triangular closed cross section is formed with the pillar-side extension part 47.

Here, the pillar-side extension part 47 is also a thick steel plate like the quarter pillar 15, has substantially an L shape constituted by at least the pillar inner bottom section (the inner surface) 47c and the pillar inner rear leg section (the rear surface) 47e, and is formed in the substantially triangular closed cross section with the quarter pillar reinforcement member 48. The roof inner side rail 65 is also a thick steel plate continuous with the pillar-side extension part 47, and is formed in substantially an L shape constituted by at least the rail inner sidewall (the inner surface) 65a and the rail inner bottom section (the bottom surface) 65b from the opening section 71, at the rear of the vehicle body.

For this reason, support strength of the roof inner side rail 65 is increased. That is, a rear end of the roof side rail closed cross-sectional part 68 can be strongly supported by closing the opening section 71 having a substantially triangular shape with the upper end portion of the quarter pillar reinforcement member 48. Accordingly, it is possible to reduce the weight of the roof side rail reinforcement member 66 by making the roof side rail reinforcement member 66 needless to extend rearward than the opening section 71.

As shown in FIG. 1, the upper end portion 59b of the center pillar closed cross-sectional part 59 is joined to the roof side rail closed cross-sectional part 68 so as to cross the center 68a. Accordingly, the upper end portion 59b of the center pillar closed cross-sectional part 59 is reinforced by the roof side rail closed cross-sectional part 68. Accordingly, a load input to the center pillar 16 due to a lateral collision can be transmitted to the roof side rail closed cross-sectional part 68 from the center pillar (i.e., the center pillar closed cross-sectional part 59), and the input load can be supported by the center pillar 16.

In addition, substitution of the components in the above-mentioned embodiment with known components may be appropriately made, and the above-mentioned variants may be appropriately combined without departing from the scope of the present invention.

For example, while the quarter pillar 15 has been exemplified as the pillar in the embodiment, as another example, the pillar can also be applied to another pillar such as a center pillar or the like.

In addition, while the rear wheel house 13 has been exemplified as the wheel house in the embodiment, as another example, the wheel house can also be applied to another wheel house such as a front wheel house or the like.

REFERENCE SIGNS LIST

10 Vehicle body side part structure
12 Side sill
13 Rear wheel house (wheel house)
13a Front end portion of rear wheel house
14 Wheel arch reinforcement member
15 Quarter pillar
15a Lower end portion of quarter pillar
15b Upper end portion of quarter pillar
16 Center pillar
17 Roof side rail
18 Side outer panel
18c Quarter pillar outer section
18e Roof side rail outer section
21 Door opening section
26 Side sill reinforcement member
43 Wheel arch
43a Wheel arch front part (front part of wheel arch)
47 Pillar-side extension part
47c Pillar inner bottom section (inner surface)
47e Pillar inner rear leg section (rear surface)
48 Quarter pillar reinforcement member (pillar reinforcement member)
48a Lower end portion of quarter pillar reinforcement member
48b Upper end portion of quarter pillar reinforcement member
48c Pillar reinforcement step section (surface opposite to door that opens and closes door opening section)
48f Lid part
48g Lid part flange (flange)
58 Center pillar reinforcement member (reinforcement member of center pillar)
65 Roof side rail inner
65a Rail inner sidewall (inner surface)
65b Rail inner bottom section (bottom surface)
66 Roof side rail reinforcement member
71 Opening section
74 Intersecting part
P, Q, R First to third hollow structures

The invention claimed is:

1. A vehicle body side part structure comprising:
a roof side rail in which a first hollow structure is formed by a roof inner side rail and a roof side rail outer section of a side outer panel being joined with each other and extending in a vehicle body forward/rearward direction; and
a quarter pillar in which a second hollow structure is formed by a pillar-side extension part, which is continuous with the roof inner side rail, and a quarter pillar outer section of the side outer panel being joined with each other and extending in a vehicle body upward/downward direction,
wherein the roof inner side rail has a roof side rail reinforcement member that extends in the vehicle body forward/rearward direction and that forms a closed cross section at inside of the first hollow structure,
the quarter pillar has a pillar reinforcement member that forms a closed cross section extending in the vehicle body upward/downward direction at inside of the second hollow structure with the pillar-side extension part, and
in an intersecting part of the roof side rail and the quarter pillar, a third hollow structure is formed by closing an opening section, at which the roof side rail is opened, with a lid part at an upper end portion of the pillar reinforcement member.

2. The vehicle body side part structure according to claim 1, wherein the roof side rail comprises the roof inner side rail having a flat plate shape and the roof side rail reinforcement member having a cross-sectional U shape, at front of the opening section in the vehicle body, and the roof side rail joins with an upper end portion of a reinforcement member of a center pillar.

3. The vehicle body side part structure according to claim 1, wherein the roof inner side rail is formed in substantially an L shape constituted by at least an inner surface and a bottom surface thereof at rear of the opening section, and
a surface of the pillar reinforcement member opposite to a door that opens and closes a door opening section is inclined outward in a vehicle width direction at a rear side of the vehicle body, a substantially triangular closed cross section is formed with the surface of the pillar reinforcement member and the pillar-side extension part constituted by at least an inner surface and a rear surface thereof, and the bottom surface and the rear surface are continuous with each other.

4. The vehicle body side part structure according to claim 3, wherein the pillar reinforcement member has:
the lid part configured to close the opening section; and
a flange that extends from the lid part toward the roof inner side rail and that is joined to a circumferential edge of the opening section of the pillar-side extension part.

5. The vehicle body side part structure according to claim 4, comprising:
a wheel house to which a lower end portion of the pillar reinforcement member is joined;
a side sill extending from a front end portion of the wheel house toward a front side of the vehicle body; and
a wheel arch reinforcement member provided on the wheel house and extending from a lower end portion of the quarter pillar to the side sill,
wherein the pillar reinforcement member is connected to a side sill reinforcement member of the side sill via the wheel arch reinforcement member.

* * * * *